US010844139B2

(12) United States Patent
Vercauteren

(10) Patent No.: US 10,844,139 B2
(45) Date of Patent: *Nov. 24, 2020

(54) CARBOHYDRATE COMPOSITION AND PROCESS FOR MAKING A CARBOHYDRATE COMPOSITION

(71) Applicant: CARGILL, INCORPORATED, Wayzata, MN (US)

(72) Inventor: Ronny Leontina Marcel Vercauteren, Beveren (BE)

(73) Assignee: CARGILL, INCORPORATED, Wayzata, MN (US)

( * ) Notice: Subject to any disclaimer, the term of this patent is extended or adjusted under 35 U.S.C. 154(b) by 104 days.

This patent is subject to a terminal disclaimer.

(21) Appl. No.: 15/128,701

(22) PCT Filed: Mar. 26, 2015

(86) PCT No.: PCT/US2015/022732
§ 371 (c)(1),
(2) Date: Sep. 23, 2016

(87) PCT Pub. No.: WO2015/148795
PCT Pub. Date: Oct. 1, 2015

(65) Prior Publication Data
US 2017/0174792 A1 Jun. 22, 2017

(30) Foreign Application Priority Data
Mar. 26, 2014 (EP) .................... 14161666

(51) Int. Cl.
| C08B 30/18 | (2006.01) |
| A23L 33/21 | (2016.01) |
| A23L 33/10 | (2016.01) |
| A23L 29/30 | (2016.01) |
| A23K 50/00 | (2016.01) |
| A23K 50/40 | (2016.01) |
| C08B 30/02 | (2006.01) |

(52) U.S. Cl.
CPC .............. *C08B 30/18* (2013.01); *A23K 50/00* (2016.05); *A23K 50/40* (2016.05); *A23L 29/35* (2016.08); *A23L 33/10* (2016.08); *A23L 33/21* (2016.08); *C08B 30/02* (2013.01); *A23V 2002/00* (2013.01)

(58) Field of Classification Search
CPC ......... C08B 30/18; C08B 30/02; A23L 33/21; A23L 29/35; A23L 33/10; A23K 50/00; A23K 50/40; A23V 2002/00
USPC ......................................................... 514/60
See application file for complete search history.

(56) References Cited

U.S. PATENT DOCUMENTS

| 2,571,541 | A | 10/1951 | Cleland et al. |
| 3,974,032 | A | 8/1976 | Harjes et al. |
| 4,021,927 | A † | 5/1977 | Idaszak |
| 5,382,611 | A † | 1/1995 | Stepto |
| 5,698,437 | A † | 12/1997 | Matsuda |
| 6,844,022 | B2 | 1/2005 | Klingler |
| 7,605,254 | B2 † | 10/2009 | McClain |
| 7,744,944 | B2 | 6/2010 | Binder et al. |
| 8,361,235 | B2 * | 1/2013 | Fosdick ................. A21D 2/181 127/30 |
| 2005/0048191 | A1† | 3/2005 | Antrim |
| 2006/0210696 | A1† | 9/2006 | Liu |
| 2007/0172931 | A1* | 7/2007 | Harrison ................ C12P 19/04 435/101 |
| 2008/0038432 | A1 | 2/2008 | Hoffman et al. |
| 2008/0175977 | A1 | 7/2008 | Harrison et al. |
| 2011/0061645 | A1* | 3/2011 | Fosdick ................. A21D 2/181 127/30 |
| 2013/0216693 | A1 | 8/2013 | Harrison et al. |
| 2013/0344045 | A1 | 12/2013 | Faure et al. |

FOREIGN PATENT DOCUMENTS

| EP | 0659769 A2 | 6/1995 |
| EP | 0561090 B1 | 6/1997 |
| EP | 0530111 B1 | 6/1999 |
| EP | 1006128 A1 | 6/2000 |
| EP | 2267169 A1 | 12/2010 |
| EP | 3128860 B1 | 8/2019 |
| JP | 03163101 A | 7/1991 |
| JP | 2005263867 A | 9/2005 |
| KR | 20120045298 A | 5/2012 |
| WO | 2005029967 A1 | 4/2005 |
| WO | 2009051977 A1 | 4/2009 |
| WO | 2012021936 A1 | 2/2012 |
| WO | 2014158777 A1 | 10/2014 |
| WO | 2015148795 A1 | 10/2015 |

OTHER PUBLICATIONS

International Search Report for Corresponding PCT Application No. PCT/U52015/022732, dated May 6, 2015, 2 Pages.
"Dietary Fiber Measurement Product Guide", Megazyme; IDO 9001:2008.
McCleary, Barry et al., "Determination of Total Dietary Fiber (CODEX Definition) by Enzymatic-Gravimetric Method and Liquid Chromatography: Collaborative Study", Journal of AOAC International, vol. 93, 2010.
McCleary, Barry et al., "Measurement of total dietary fiber using AOAC method Jan. 2009 (AACC International Approved Method 32-45.01): Evaluation and Updates", Cereal Biomacromolesules, vol. 90, 2013.
Otles, Semith et al., "Healts effects of dietary fiber", Acta Sci Pol, Technol. Aliment., vol. 13(2), 2014.

\* cited by examiner
† cited by third party

*Primary Examiner* — Yin-Horng Shiao

(57) ABSTRACT

The invention relates to a carbohydrate composition characterized in that it has a dextrose equivalence of from 20 to 25 and further characterized in that it has a fibre content of from 10 to 90% by weight of the composition on dry basis. The invention further relates to a process for making a carbohydrate composition. Further the invention relates to a food, feed, pet food, pharmaceutical, cosmetic and industrial products comprising the carbohydrate composition of the present invention and other ingredients and to the use of the carbohydrate composition of the present invention.

18 Claims, No Drawings

CARBOHYDRATE COMPOSITION AND PROCESS FOR MAKING A CARBOHYDRATE COMPOSITION

CROSS-REFERENCE TO RELATED APPLICATIONS

This application is a national phase application of International Application Serial No. PCT/US2015/022732, filed Mar. 26, 2015, entitled CARBOHYDRATE COMPOSITION AND PROCESS FOR MAKING A CARBOHYDRATE COMPOSITION, which claims priority to European Patent Application, Serial No. EP14161666.4, filed Mar. 26, 2014, both of which are hereby incorporated by reference in their entirety.

FIELD OF THE INVENTION

The invention relates to a carbohydrate composition characterized in that it has a dextrose equivalence of from 20 to 25 and further characterized in that it has a fibre content of from 10 to 90% by weight of the composition on dry basis. The invention further relates to a process for making a carbohydrate composition. Further the invention relates to food, feed, pet food, pharmaceutical, cosmetic and industrial product comprising the carbohydrate composition of the present invention and other ingredients and to the use of the carbohydrate composition of the present invention.

BACKGROUND OF THE INVENTION

An increase of the content of dietary fibre in the human or animal diet has long been recognized to incur certain health benefits. Currently, human diets, in particular in industrialised countries, remain very low in dietary fibre. A variety of ingredients are suitable for use as dietary fibre in food, feed, pet food, and pharmaceutical compositions. Also fibre can be used in applications such as cosmetics and industrial applications where they provide functional advantages. Many of these ingredients however present disadvantages such as difficulty of use, low solubility, high cost and the like.

Dextrin for example contains a certain amount of soluble dietary fibre. Dextrin is a starch conversion product and typically occurs as a free-flowing white, yellow, or brown powder and consists chiefly of polygonal, rounded, or oblong or truncated granules. Dextrin can be produced from any of several grain- or root-based native starches, i.e. physically and chemically unmodified starches. Dextrin is partially to completely soluble in water. Dextrinization process is known for many years and comprises heating starch at high temperatures and very low moisture content, typically below 5%, in the presence of an acid catalyst. Dextrins are very useful for their bulking properties; they can be used in place of, or in addition to, conventional carbohydrate products in food, feed, pet food, pharmaceutical, cosmetic and also industrial compositions. Dextrins typically have a Dextrose Equivalent (DE) of maximum 20.

EP1006128A1 describes a dextrinization process wherein starch at moisture content lower than 5% is heated in the presence of acid at temperatures between 120 and 300° C. The resulting dextrin, called here branched maltodextrin, has a dextrose equivalence below 20.

WO2009/051977A1 describes an oligosaccharide composition that is digestion resistant or slowly digestible, said composition contains about 10-70% by weight fibre on a dry solids basis and has a dextrose equivalence of about 25-65. It is produced from a feed composition that comprises at least one monosaccharide or linear saccharide oligomer.

EP0659769A2 describes an agent for promoting the proliferation of Bifidobacterium produced by heating starch at a moisture content of 0.1 to 7% by weight in the presence of hydrochloric acid at a temperature of 140 to 200° C. for 2 to 120 minutes. The process described therein comprises a first step wherein starch molecules are rearranged to produce pyrodextrin and a further step of hydrolysing the pyrodextrin. Both steps are each conducted under different acidic conditions, and different moisture conditions.

Known processes still have the disadvantage of being quite complex and burdensome and known dextrins present several disadvantages such as low fibre content, high cost.

There is still a need for a carbohydrate composition that has improved properties compared to the existing products, in particular compared to known dextrins. There is also still a need for a process to produce starch conversion products that requires less energy, is more economical and more efficient.

The present invention provides for such a carbohydrate composition and such process.

SUMMARY OF INVENTION

The present invention relates to a carbohydrate composition characterized in that it has a dextrose equivalence of from 20 to 25.

Further, the present invention relates to a process to make a carbohydrate composition comprising the steps of:
  a. Providing a starch or starch containing composition having a moisture content of from 6 to 15% and a pH of from 1.0 to 3.0;
  b. Treating the starch or starch containing composition of step a) at a temperature of from 60° C. to 150° C. during at least 5 minutes;
  c. Collecting the carbohydrate composition.

Further the present invention relates to a carbohydrate composition obtained according to the process of the present invention.

Further, the present invention relates to a food, feed, pet food, pharmaceutical, cosmetic or industrial product comprising the carbohydrate composition of the present invention.

Further, the present invention relates to the use of the carbohydrate composition of the present invention as a bulking agent in food, feed, pet food, pharmaceutical, cosmetic or industrial product.

Further, the present invention relates to the use of the carbohydrate composition of the present invention to increase human or animal digestive health.

DETAILED DESCRIPTION

The present invention relates to a carbohydrate composition characterized in that it has a dextrose equivalence (DE) of from 20 to 25. The carbohydrate composition is a starch conversion product. Said composition can be in the form of a syrup or in the form of a powder.

The dextrose equivalence is a value that expresses the percentage of reducing sugars present in the carbohydrate composition. Thus the present invention relates to a carbohydrate composition characterized in that it has a content in reducing sugars of from 20 to 25%.

Preferably the carbohydrate composition of the present invention has a dextrose equivalence of from 21 to 25, more preferably from 21 to lower than 25, more preferably from 21 to 24.

The dextrose equivalence is measured according to the method described below.

The carbohydrate composition of the present invention is further characterized in that it has a fibre content of from 10 to 90% by weight of the composition on dry basis (wt % ds), preferably from 30 to 80 wt % ds, more preferably from 50 to 80 wt % ds, more preferably from 60 to 75 wt % ds, even more preferably from 60 to 70 wt % ds, yet even more preferably from 65 to 70 wt % ds. Fibre content according to the present invention is understood to be dietary fibre content. Preferably, fibre is soluble fibre. Thus preferably, the carbohydrate composition has a soluble fibre content of from 10 to 90% by weight of the composition on dry basis (wt % ds), preferably from 30 to 80 wt % ds, more preferably from 50 to 80 wt % ds, more preferably from 60 to 75 wt % ds, even more preferably from 60 to 70 wt % ds, yet even more preferably from 65 to 70 wt % ds. Preferably, the carbohydrate composition of the present invention can thus be further defined as a fibre composition, more preferably a soluble fibre composition. Fibre content is measured according to the method described below.

The carbohydrate composition of the present invention is further characterized in that it has a number average molecular weight (Mn) of from 500 to 1500 g/mole, preferably of from 600 to 1400 g/mole, more preferably from 700 to 1300 g/mole, even more preferably from 800 to 1200 g/mole.

The carbohydrate composition of the present invention is further characterized in that it has a weight average molecular weight (Mw) of from 2000 to 6000 g/mole.

The carbohydrate composition of the present invention can also be characterized by its polydispersity index (PD) which is the ratio Mw/Mn. The carbohydrate composition preferably has a polydispersity index of 6 and below.

The carbohydrate composition of the present invention is further characterized in that it comprises 15 wt % or less, preferably 10 wt % or less, preferably 8 wt % or less, more preferably 7 wt % or less, such as preferably from 7 wt % to 0.5 wt %, of monosaccharides such as dextrose and/or fructose. The carbohydrate composition of the present invention is further characterized in that it comprises 10 wt % or less, preferably 8 wt % or less, more preferably 7 wt % or less such as preferably from 7 wt % to 1 wt %, more preferably from 5 wt % to 0.5 wt % of DP2 molecules, i.e. saccharides having a Degree of Polymerization (DP) of 2. The DP expresses the number of monomeric units present in the saccharide molecule.

The present invention further relates to a process for producing a carbohydrate composition comprising the steps of:
  a) Providing a starch or starch containing composition having a moisture content of from 6 to 15% and a pH of from 1.0 to 3.0
  b) Treating the starch or starch containing composition of step a) at a temperature of from 60° C. to 150° C. during at least 5 minutes;
  c) Collecting the carbohydrate composition.

The botanical origin of the starch is not restricted. Starch can thus be derived from any source, such as cereals, roots such as potatoes or cassava, fruits such as bananas, peas and the like or mixtures thereof. Preferably however, starch is derived from cereals, tapioca and/or potato, more preferably the starch is derived from cereal, even more preferably the cereal is wheat and/or corn. Starch may be native starch or modified starch, such as for example physically modified starch, e.g. pre-gelatinized starch, thermally or hydrothermally inhibited starch, starch treated with super-heated steam, starch containing damaged starch granules obtained e.g. by milling, microfluidization, high pressure homogenization, and the like; and/or chemically modified starch, e.g. acetylated starch, hydroxypropylated starch and the like. Preferably, the starch is native starch. Native starches are produced through the separation of naturally occurring starch from starch containing plant material. The native starch still retains its original granular structure and characteristics. Thus preferably, the starch is native wheat and/or native corn starch, more preferably waxy varieties thereof; which provide a carbohydrate composition with improved taste and colour.

The starch containing composition preferably comprises at least 60 wt %, preferably at least 70 wt %, preferably at least 75 wt % of native starch by weight of the composition. The starch containing composition can be cereal flour, preferably wheat flour and/or corn flour. The starch containing composition can be mixtures of starch and modified starch such as defined above. The starch containing composition can be mixtures of starch with maltodextrin, dextrose for example.

Preferably the starch of the starch containing composition is native wheat starch and/or native corn starch, more preferably waxy varieties thereof, which provide a carbohydrate composition with improved taste and colour.

Additionally, native starch can be pre-treated by extracting lipids (such as for example monoglycerides, diglycerides and triglycerides), free fatty acids, phospholipids, proteins and/or salts present in or adsorbed on the surface of the starch kernel. Such extraction can be done by cold or hot extraction using water or an aqueous buffer or an organic solvent (such as for example ethanol, isopropanol or hexane) or a mixture of water and an organic solvent (such as for example ethanol, isopropanol or hexane). Additionally prior to the extraction, the starch granule can be treated with proteinases, peptidases and/or lipases, esterases, phospholipases and other enzymes that are able to hydrolyse proteins or lipids. Other cleaning techniques may also be used, such as for example alkaline treatment in water or water/organic solvent mixture, followed by neutralisation or washing step. Further, a washing step with water or demi water can be added. Preferably, such pre-treatment is done prior to step a).

Additionally, modified starch can be pre-treated by extracting lipids (such as for example monoglycerides, diglycerides and triglycerides), free fatty acids, phospholipids, proteins and/or salts present in or adsorbed on the surface of the starch. Such extraction can be done by cold or hot extraction using an organic solvent (such as for example ethanol, isopropanol or hexane). Additionally prior to the extraction, the modified starch can be treated with proteinases, peptidases and/or lipases, esterases, phospholipases, lysophospholipases, hemicellulases and other enzymes that are able to hydrolyse proteins or lipids. Preferably, such pre-treatment is done prior to step a).

The starch or starch containing composition of step a) has a moisture content of from 6 to 15%, preferably of from 6 to 14%, more preferably from 7 to 12%, even more preferably of from 7 to 11%, yet even more preferably of from 8 to 10%. Such moisture content can be obtained either by providing a dry starch or starch containing composition or by drying starch or starch containing composition with a suitable method, such a with a fluid bed for example. In any event, the moisture content should not be such that the starch or the starch in the starch containing composition would gelatinize during the process.

Preferably, during step b), the moisture content of the starch or starch containing composition remains at a value of from 6 to 15%, preferably of from 6 to 14%, more preferably from 7 to 12%, even more preferably of from 7 to 11%, yet even more preferably of from 8 to 10%. Preferably further, during step b), the moisture content of the starch or starch containing composition varies with a maximum of 2%, preferably 1.5%, more preferably 1%, event more preferably 0.5%, of its initial moisture content. The initial moisture content is understood to be the moisture content of the starch or starch containing composition in step a) of the process.

The starch or starch containing composition has a pH of from 1.0 to 3.0, preferably from 1.3 to 2.5, even more preferably from 1.3 to 2.9, yet even more preferably from 1.4 to 2, yet even more preferably from 1.4 to 1.9. This can be achieved preferably by adding an acid to the starch or starch containing composition. The acid can be organic or inorganic acid. Preferably the acid is hydrochloric acid, nitric acid, phosphoric acid or mixtures of two or more thereof. More preferably the acid is hydrochloric acid. Thus preferably, the present invention relates to a process comprising the steps of:
  a) Providing a starch or starch containing composition having a moisture content of from 6 to 15% and a pH of from 1.0 to 3.0 and comprising an acid, and
  b) Treating the starch or starch containing composition of step a) at a temperature of from 60° C. to 150° C. during at least 5 minutes in the presence of the acid of step a), and
  c) Collecting the carbohydrate composition.

It has been found by the present inventors that the process of the present invention allows to hydrolyse starch molecules and rearrange them in a single step, providing molecules, with a higher degree of branching compared to the initial starch molecule. There is no need to have a separate controlled hydrolysis step and a subsequent rearrangement step or vice versa, such as described in the prior art.

The collected carbohydrate composition can be fractionated. This can allow to further increase the fibre content for example by removing components such as for example DP1 and DP2 saccharides.

Alternatively or additionally, the collected carbohydrate composition can be concentrated. This can be achieved by distilling off the water under reduced pressure. Alternatively or additionally, the collected carbohydrate composition can be bleached. For instance, this can be achieved by hydrogen peroxide treatment.

Alternatively or additionally, the collected carbohydrate composition can be neutralized.

Alternatively or additionally, the collected carbohydrate composition can be separated into two or more fractions having for example a different molecular weight profile such as a different average molecular weight, such as number average molecular weight or weight average molecular weight; this can be done by chromatography for example.

Alternatively or additionally, the collected carbohydrate composition can be treated with carbohydrases like pullulanase, glucoamylase and/or alpha-amylase, followed by removal of the lower molecular weight mono- and disaccharides from the carbohydrate composition. These additional and alternative steps can be done in any suitable order. Further, the collected carbohydrate composition can be demineralised, or otherwise purified by removing proteins, lipids and/or fatty acids by ion-exchange techniques, such as ion-exchange resins or by electrodialysis.

Preferably, at least step b) of the process is conducted in a closed reactor. This allows a better control of the moisture content and the temperature during the treatment. More preferably, at least step b) is conducted under vacuum conditions or in the presence of nitrogen gas or carbon dioxide gas.

The starch or starch containing composition is treated at a temperature of from 60 to 150° C., preferably from 65 to 145° C., more preferably from 70 to 140° C., even more preferably from 80 to 140° C., yet even more preferably from 85 to 135° C., yet even more preferably from 90 to 130° C., yet even more preferably from 100 to 125° C., yet even more preferably from 100 to 120° C., yet even more preferably from 100 to 110° C.

The treatment time of step b) is at least 5 minutes. Preferably the treatment is from 5 minutes to 20 hours, more preferably from 5 minutes to 10 hours, more preferably from 30 minutes to 6 hours, even more preferably from 1 hour to 5 hours, even more preferably from 1 hour to 4 hours, yet even more preferably from 1 to 3 hours, yet even more preferably from 1 hour to 2 hours.

Heating can be done by indirect heating, such as by passing water or oil at a suitable temperature in a double jacketed reactor, or by direct heating by means of dry steam or microwave heating for example.

Preferably step b) is done under stirring. Stirring can be done by means of a mixing equipment such as a static mixer or by means of rotating paddles, or by using a rotating drum.

The process of the present invention can be batch, semi-batch or continuous.

Further, the present invention relates to a carbohydrate composition obtainable according to the process of the present invention. The invention thus further relates to a carbohydrate composition, such as defined above, which is prepared by:
  a) Providing a starch or starch containing composition having a moisture content of from 6 to 15% and a pH of from 1.0 to 3.0,
  b) Treating the starch or starch containing composition of step a) at a temperature of from 60° C. to 150° C. during at least 5 minutes,
  c) Collecting the carbohydrate composition.

Further the present invention relates to food, feed, pet food, pharmaceutical, cosmetic or industrial product comprising the carbohydrate composition of the present invention and other ingredients.

The carbohydrate composition of the present invention is water soluble and can easily be integrated in the preparation process of food, feed, pet food, pharmaceutical, cosmetic or even industrial products.

The food product can be a beverage. Examples of beverages are carbonated and non-carbonated beverages, alcoholised and non-alcoholised beverages, fruit juices, concentrates juice mixes, flavoured waters and beverage dry mixes, hot beverage preparations. The food product can be a dairy product such as yoghurt, yogurt drinks, ice cream, smoothies, milk drinks, puddings and other dairy based food products. The food product can be a bakery product such as bread, cake, biscuits, brownies, sponge cakes, crackers, doughnuts, pastries and the like. The food product can be a breakfast cereal, such as coated or non-coated breakfast cereal, filled breakfast cereal, extruded breakfast cereal, cereal bars and the like. The food product can be a confectionery product, such as hard candy, chewing gum, chocolate, cocoa powder, jelly candies, and the like. The food product can be a convenient type of food product such as a dry mix for sauces, a dry mix for instant drinks preparations, a spread, a mayonnaise, a high solid filling for use in snacks, chocolates, cookies and the like. It will be evident to the skilled person which other ingredients are to be used in order to make an appropriate food product.

Advantageously the carbohydrate composition of the present invention is used as a bulking agent. It can be used in the production process of food, feed, pet food products in replacement of conventional carbohydrates, such as sugar or other full calorie carbohydrates. Thus the present invention further relates to the use of the carbohydrate of the present invention as a bulking agent in food, feed, pet food, pharmaceutical, cosmetic and industrial products.

The carbohydrate composition of the present invention can be used as a source of soluble fibre. It can be used to produce fibre containing and even high fibre containing food, feed, pet food products. A high fibre food, feed or pet food product is one that can provide at least 5 g of fibre per 100 g of the food, feed or pet food. Further the carbohydrate composition can be used in combination with other dietary fibres to further increase the fibre content of the food, feed or pet food product or to provide a combination of advantages.

The carbohydrate composition of the present invention is typically white to light yellow and can thus be advantageously added to food, feed and pet food products without affecting the colour and is typically not perceived in the final food, feed and pet food product.

The pharmaceutical product can be in the form of a tablet or a capsule, or a syrup, dry granules or any other suitable pharmaceutical product. The pharmaceutical product can suitably be a preparation for improving digestive health in human or animal.

The cosmetic product can be a cream (such as hand cream, facial cream, body lotion), a washing lotion and any other suitable cosmetic product.

The industrial product can be a coating composition for paper, a paint and any other suitable industrial product.

Further, the present invention relates to the use of the carbohydrate composition of the present invention to increase digestive health of a human or animal. The carbohydrate composition of the present invention comprises enough dietary fibre to have a positive effect on the digestive health of a human or animal consuming said carbohydrate composition or a food, feed or pet food product containing such.

Methods of Measurement

Moisture content of a product (starch, starch containing composition or carbohydrate composition according to the present invention for example): a product sample is weighed (W1) and put in a metal cup of a certain weight (W0). The metal cup containing the product sample is put in an oven at 105° C. without ventilation during 30 minutes. The metal cup containing the product sample is weighed after cooling at room temperature in a dessicator (W2). The weight of the dried product sample is calculated: W3=W2−W0. The initial moisture content of the product sample is calculated as follows: ((W1−W3)/W1) %.

Dextrose equivalence (DE): the DE is measure according to the Lane and Eynon method described in Standard Analytical Method E-26, Corn Refiners Association.

Fibre content: is measured according to AOAC Official Method 2009.01, Total Dietary Fibre (TDF) in Foods.

Molecular weight distribution: Mw and Mn are measured by Gel Permeation Chromatography.

Polydispersity index (PD): PD=Mw/Mn

The present invention will be illustrated by the following examples.

EXAMPLE

Example 1

Several carbohydrate compositions (Sample 1 to 8) are made by the process described below, the process conditions are given in table 1.

Starch (native corn starch, C*gel 03401, Cargill) is acidified by addition of HCl 1M or a solution containing 0.75N HCl and 0.25N H3PO4 and then dried by using a fluid bed dryer at 60° C. The pH of the starch is measured by dissolving 10 g of starch in 90 g of distilled water at 20° C.

Treatment: the starch thus obtained is put into a glass bottle which is then closed, and heated in a pre-warmed hot air oven to a certain temperature to undergo a dextrinization reaction. The reaction is stopped after a certain period of time by removing the vessel out of the oven and put it at 20° C. temperature. The resulting carbohydrate composition is collected, manually milled with pestle and mortar and analysed for DE, fibre content, Mn, Mw, polydispersity (PD).

TABLE 1

| Sample | Acid | pH | Moisture before treatment (%) | Temperature (° C.) | Treatment time (hours) |
|---|---|---|---|---|---|
| 1 | HCl | 2.3 | 8.8 | 120 | 1 |
| 2 | HCl | 2.3 | 10.2 | 100 | 6 |
| 3 | HCl | 1.9 | 9 | 100 | 1 |
| 4 | HCl | 1.9 | 9.7 | 100 | 2 |
| 5 | HCl + H3PO4 | 1.9 | 8.8 | 100 | 1 |
| 6 | HCl + H3PO4 | 1.9 | 8.8 | 100 | 1 |
| 7 | HCl + H3PO4 | 1.9 | 8.8 | 100 | 1.5 |
| 8 | HCl + H3PO4 | 1.9 | 8.8 | 100 | 2 |

TABLE 2

| Sample | DE | Fibre content (wt % ds) | Mn | Mw | PD |
|---|---|---|---|---|---|
| 1 | 20.0 | 69.3 | 1013 | 4720 | 4.7 |
| 2 | 26.5 | 67.3 | 773 | 2196 | 2.8 |
| 3 | 23.5 | 67.4 | 971 | 4611 | 4.7 |
| 4 | 23.9 | 68.1 | 887 | 3629 | 4.1 |
| 5 | 24.9 | 64.1 | 884 | 3071 | 3.5 |
| 6 | 21.7 | 62.8 | 921 | 3387 | 3.7 |
| 7 | 24.4 | 69.4 | 838 | 2925 | 3.5 |
| 8 | 24.7 | 70.3 | 841 | 3088 | 3.7 |

The invention claimed is:

1. A carbohydrate composition comprising:
    a hydrolyzed and rearranged product of an initial starch or of an initial starch present in a starch-containing composition, the product having a higher degree of branching than the initial starch;
    wherein the carbohydrate composition has
        a dextrose equivalence of from 20 to 25,
        a soluble fiber content consisting of from 60% to 75% by weight of the carbohydrate composition on dry basis,
        a concentration of monosaccharides of from 0.5 wt % to 15 wt %, and
        a concentration of saccharides having a degree of polymerization of two of from 0.5 wt % to 5 wt %.
2. The carbohydrate composition of claim 1, wherein the carbohydrate composition is characterized in that it has a number average molecular weight $M_n$ of from 500 to 1500 g/mole.

3. The carbohydrate composition of claim 1, wherein the carbohydrate composition is characterized in that it is chemically substituted, oxidized, or hydrogenated.

4. A process to make the carbohydrate composition of claim 1, comprising the steps of:
   a) providing the initial starch or a starch-containing composition comprising the initial starch having a moisture content of from 6 to 15 wt % and a pH of from 1.0 to 3.0;
   b) treating the initial starch or starch-containing composition of step a) at a temperature of from 60° C. to 150° C. for at least 5 minutes; and
   c) collecting the carbohydrate composition of claim 1.

5. The process of claim 4, wherein step a) comprises adding an acid to the initial starch or starch-containing composition to obtain the starch or starch-containing composition with a pH value of from 1.0 to 3.0.

6. The process of claim 5, wherein the acid is hydrochloric acid, nitric acid, phosphoric acid, or mixtures of two or more thereof.

7. The process of claim 4, wherein, during step b), the moisture content of the initial starch or starch-containing composition remains at a value between 6 and 15 wt %.

8. The process of claim 7 wherein the moisture content varies with a maximum of 2 wt % from the moisture content of step a).

9. The process of claim 4, further comprising subjecting the collected carbohydrate composition to purification and/or concentration and/or bleaching and/or separation in two or more fractions having a different average molecular weight.

10. The process of claim 4, wherein at least step b) is conducted in a closed reactor.

11. A food, feed, pet food, pharmaceutical, cosmetic, or industrial product comprising the carbohydrate composition of claim 1 and other ingredients.

12. A bulking agent for use in a food, feed, pet food, pharmaceutical, cosmetic, or industrial product comprising a carbohydrate composition according to claim 1.

13. The carbohydrate composition of claim 1, wherein the digestive health of a human or animal is increased when said human or animal consumes, accordingly, a food, feed, pet food, or pharmaceutical product comprising said carbohydrate composition.

14. The carbohydrate composition of claim 1, wherein the carbohydrate composition has a soluble fiber content consisting of from 65 to 75% by weight of the carbohydrate composition on dry basis.

15. The carbohydrate composition of claim 1, wherein the carbohydrate composition has a concentration of monosaccharides of from 0.5 wt % to 7 wt %.

16. The carbohydrate composition of claim 1, wherein the $M_n$ of the carbohydrate composition is from 800 to 1200 g/mole.

17. The carbohydrate composition of claim 1, wherein the carbohydrate composition has a weight average molecular weight ($M_w$) of from 2000 to 6000 g/mole.

18. The carbohydrate composition of claim 1, wherein the carbohydrate composition has a polydispersity index of equal to or less than 6.

* * * * *